(12) United States Patent
Bertrand et al.

(10) Patent No.: US 11,593,616 B2
(45) Date of Patent: Feb. 28, 2023

(54) METHOD FOR DETERMINING A DATA ITEM'S MEMBERSHIP OF A DATABASE AND ASSOCIATED COMPUTER PROGRAM PRODUCT AND INFORMATION MEDIUM

(71) Applicant: THALES, Courbevoie (FR)

(72) Inventors: Pierre Bertrand, Gennevilliers (FR); Benoît Huyot, Gennevilliers (FR); Sandra Cremer, Vélizy (FR)

(73) Assignee: THALES, Courbevoie (FR)

( * ) Notice: Subject to any disclaimer, the term of this patent is extended or adjusted under 35 U.S.C. 154(b) by 926 days.

(21) Appl. No.: 16/470,131

(22) PCT Filed: Dec. 13, 2017

(86) PCT No.: PCT/EP2017/082673
§ 371 (c)(1),
(2) Date: Jul. 8, 2019

(87) PCT Pub. No.: WO2018/109030
PCT Pub. Date: Jun. 21, 2018

(65) Prior Publication Data
US 2019/0392293 A1 Dec. 26, 2019

(30) Foreign Application Priority Data
Dec. 15, 2016 (FR) .................................... 16 01785

(51) Int. Cl.
*G06N 3/04* (2006.01)
*G06K 9/62* (2022.01)
(Continued)

(52) U.S. Cl.
CPC ......... *G06N 3/0454* (2013.01); *G06K 9/6262* (2013.01); *G06N 3/08* (2013.01); *G06V 40/1365* (2022.01)

(58) Field of Classification Search
CPC ...... G06N 3/0454; G06N 3/08; G06N 3/0481; G06K 9/6262; G06K 9/6274; G06V 40/1365; G06V 10/82
(Continued)

(56) References Cited

U.S. PATENT DOCUMENTS

| 9,436,895 B1 | 9/2016 | Jones et al. | |
| 9,633,282 B2 * | 4/2017 | Sharma | G06V 20/647 |
| 2016/0148079 A1 * | 5/2016 | Shen | G06N 3/0454 |
| | | | 382/157 |

OTHER PUBLICATIONS

Heinly, "Comparative evaluation of binary features". In ECCV, 2012 (Year: 2012).*

(Continued)

*Primary Examiner* — Juan A Torres
(74) *Attorney, Agent, or Firm* — ArentFox Schiff LLP

(57) ABSTRACT

The present invention relates to a method for determining a data item's membership in a database, the method comprising:
a supervised training phase to obtain three trained neural networks,
a phase of preparing the database by application of the first trained network to each data item of the base, and
a utilization phase comprising the step of:
using the first network on the data item,
obtaining a binary value representative of the identity between the data item and a data item of the base by application of the third network, and
selecting of those data items of the database for which the binary value obtained corresponds to an identity between the data item and the data items.

10 Claims, 1 Drawing Sheet

(51) Int. Cl.
*G06N 3/08* (2023.01)
*G06V 40/12* (2022.01)

(58) Field of Classification Search
USPC .......................................................... 706/25
See application file for complete search history.

(56) References Cited

OTHER PUBLICATIONS

Han, X. et al., "MatchNet: Unifying feature and metric learning for patch-based matching" , 2015 IEEE Conference on Computer Vision and Pattern Recognition (CVPR), IEEE, pp. 3279-3286, 2015.

International Search Report, issued by International Searching Authority in corresponding International Application No. PCT/EP2017/082673, dated Apr. 20, 2018.

Marasco, E. et al., "Robust and interoperable fingerprint spoof detection via convolutional neural networks", 2016 IEEE Symposium on Technologies for Homeland Security (HST), IEEE, (6 Pages Total) 2016.

Zagoruyko, S. et al., "Learning to compare image patches via convolutional neural networks", 2015 IEEE Conference on Computer Vision and Pattern Recognition (CVPR), IEEE, pp. 4353-4361, 2015.

* cited by examiner

METHOD FOR DETERMINING A DATA ITEM'S MEMBERSHIP OF A DATABASE AND ASSOCIATED COMPUTER PROGRAM PRODUCT AND INFORMATION MEDIUM

CROSS-REFERENCE TO RELATED APPLICATIONS

This application is a National Stage Entry of International Patent Application No. PCT/EP2017/082673, filed on Dec. 13, 2017, which claims priority to French Patent Application No. 16 01785, filed on Dec. 15, 2016. The disclosures of the priority applications are incorporated in their entirety herein by reference.

TECHNICAL FIELD

The present invention relates to a method for determining a data item's membership in a database. The present invention also relates to an associated computer program product and information medium.

DESCRIPTION OF THE RELATED TECHNOLOGY

In the identity field, it is desirable to avoid the issuance of two identity cards for the same person. For verification, it is thus suitable to be able to answer the following question: given two fingerprint images, do they come from the same finger?

To that end, a technique is known based on a database containing fingerprints. The technique consists of extracting minutiae from the image of the fingerprints and making comparisons via the extracted minutiae.

However, such a technique has an excessively slow execution speed.

There is therefore a need for a method for determining a data item's membership in a database that is faster to implement.

SUMMARY

To that end, proposed is a method for determining the membership of a data item, called data item to be compared, in a database, the method including a supervised training phase, the training phase including at least the step of providing a desired performance criterion, optimizing three neural networks from a training database, in order to obtain three trained neural networks, the optimization being done under at least two constraints, a first constraint of compliance with the performance criterion and a second constraint according to which the first neural network and the second neural network are identical, the training database including pairs of training data to be compared, the first neural network extracting, from a first data item of a pair of the training database, a first attribute vector, the attributes of the first vector being relative to the first data item, the second neural network extracting, from a second training data item of the same pair, a second attribute vector, the attributes of the second vector being relative to the second data item, the third neural network performing a set of operations transforming the first vector and second vector pair into a binary value representative of the identity between the two learning data items. The method comprises a phase of preparing the database including at least the step of applying the first trained neural network on each data item from the database in order to obtain basic attribute vectors, and an exploitation phase including at least the step of using the first neural network on the data item to be compared, in order to obtain an attribute vector to be compared, for each basic attribute vector, obtaining a binary value representative of the identity between the data to be compared and a data item from the database by applying the third neural network to the basic attribute vector and the attribute vector to be compared, and selecting data from the database for which the obtained binary value corresponds to an identity between the data to be compared and the data from the database.

According to specific embodiments, the determining method includes one or more of the following features, considered alone or according to any technically possible combination:

the desired performance criterion consists of imposing a minimal precision for the number of pairs correctly identified and a minimal execution speed of the operations for the third neural network.

the third neural network fulfills at least one property chosen from the group of properties made up of a first property according to which the third neural network is a network whereof the neurons are completely connected, and a second property according to which the first operation of the third neural network is the concatenation of the two attribute vectors.

the first neural network and the second neural network fulfill at least one property chosen from the group of properties made up of a first property according to which the first neural network and the second neural network are neural networks including at least one convolutional neural layer, a second property according to which the first neural network and the second neural network are neural networks including at least one layer of entirely connected neurons, and a third property according to which the first neural network and the second neural network are neural networks including at least one layer of neurons intended to perform pooling.

the training phase includes a step for choosing the number of attributes of each vector, the training phase being implemented with the chosen number.

the data items are at least one of the elements of the group made up of images, biometric data, and fingerprints.

the desired performance criterion consists of imposing a first minimal precision for the number of pairs correctly identified, the implementation of the data selection step leading to obtaining a plurality of candidate data items, the exploitation phase including the implementation of a method for determining the identity between the candidate items and the data item, the method for determining the identity corresponding to a second minimal precision for the number of pairs correctly identified, the second minimal precision being strictly greater than the first minimal precision.

the training phase includes a step for creating the training base by extracting pairs from the database, the extracted pairs being such that a portion of between 45% and 55% of the pairs from the training base are identical pairs.

Also proposed is a computer program product including a readable information medium, on which a computer program is stored comprising program instructions, the computer program being able to be loaded on a data processing unit and suitable for driving the implementation of a method as previously described when the computer program is implemented on the data processing unit.

Also proposed is a readable information medium including program instructions forming a computer program, the computer program being able to be loaded on a data processing unit and suitable for driving the implementation of a method as previously described when the computer program is implemented on the data processing unit.

BRIEF DESCRIPTION OF THE DRAWINGS

Other features and advantages of the invention will appear upon reading the following description of embodiments of the invention, provided as an example only and in reference to the drawings, which are.

DETAILED DESCRIPTION

Figure 1:
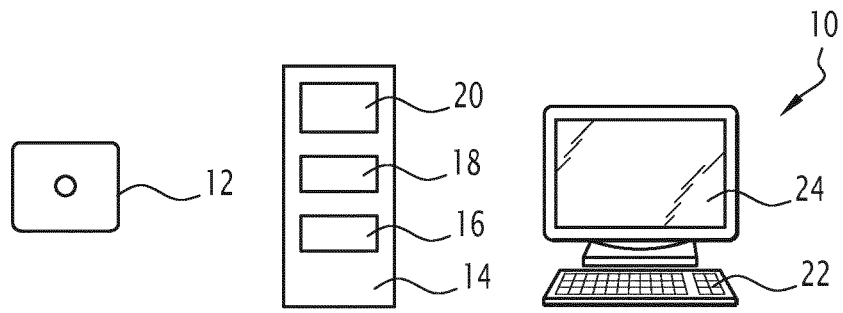
FIG. 1, a schematic view of an example system allowing the implementation of a method for determining a data item's membership in a database, and FIG. 2, a schematic view of a block diagram of part of an example implementation of a method for determining a data item's membership in a database.

A system 10 and a computer program product 12 are shown in FIG. 1. The interaction of the computer program product 12 with the system 10 makes it possible to implement a method for determining a data item's membership in a database.

The system 10 is a computer.

More generally, the system 10 is an electronic computer able to manipulate and/or transform data represented as electronic or physical quantities in registers of the system 10 and/or memories into other similar data corresponding to physical data in the memories, registers or other types of display, transmission or storage devices.

The system 10 includes a processor 14 comprising a data processing unit 16, memories 18 and an information medium reader 20. The system 10 also comprises a keyboard 22 and a display unit 24.

The computer program product 12 includes a readable information medium 20.

A readable information medium 20 is a medium readable by the system 10, usually by the data processing unit 14. The readable information medium 20 is a medium suitable for storing electronic instructions and able to be coupled with a bus of a computer system.

As an example, the readable information medium 20 is a floppy disk, an optical disc, a CD-ROM, a magnetic-optical disc, a ROM memory, a RAM memory, an EPROM memory, an EEPROM memory, a magnetic card or an optical card.

A computer program comprising program instructions is stored on the readable information medium 20.

The computer program can be loaded on the data processing unit 14 and is suitable for driving the implementation of a method for determining a data item's membership in a database when the computer program is implemented on the data processing unit 14.

Figure 2:
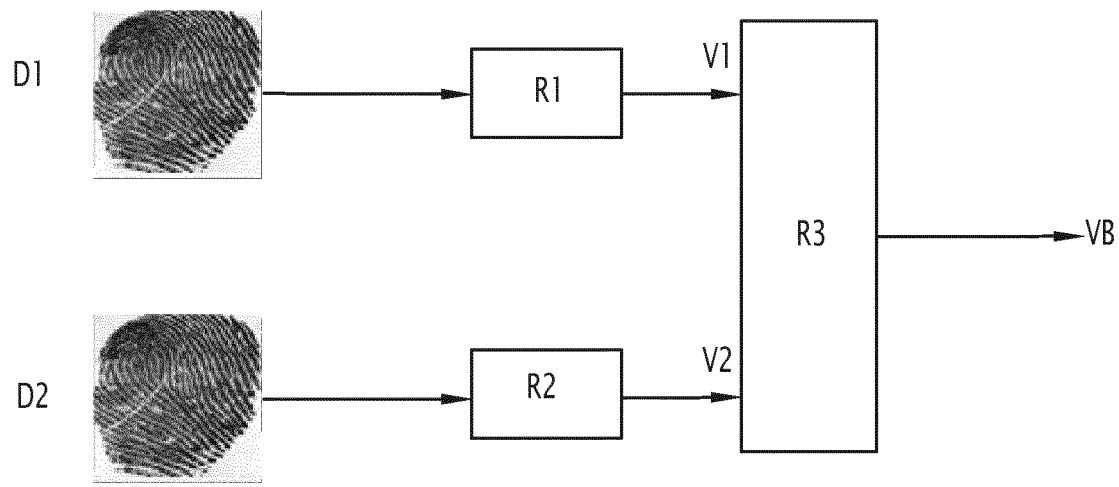

The operation of the system 10 interacting with the computer program product 12 is now described in reference to FIG. 2, which schematically illustrates part of an example implementation of a method for determining a data item's membership in a database.

The determination of a data item's membership in a database is used for many applications.

For example, this makes it possible to identify a failure of a photo identification system, owing to a photo database of the system corresponding to a plurality of failures or if an identification card has already been issued for a given fingerprint.

In such contexts, the data items are images, biometric data items or digital fingerprints.

In the example shown in FIG. 2, the data items are fingerprints.

Furthermore, the number of data items in the database is greater than or equal to 1 million data items, preferably greater than 10 million data items. The determining method includes three phases: a training phase, a preparation phase and an operating phase.

The training phase includes a supply step, an optimization step and a creation step.

During the supply step, a desired performance criterion is supplied.

For example, an operator uses the keyboard 22 to enter a performance criterion to be fulfilled: error type <1%, for example.

According to a first example, the performance criterion is a precision and speed criterion that is described more precisely hereinafter.

In a variant, the performance criterion is the false-negative rate to avoid false rejections. Such a criterion is particularly useful in case of coupling as preselection with a traditional method as described later.

At the end of the supply step, a desired performance criterion is known.

During the creation step, a training base is created from the database.

The training base is a base containing a set of pairs of data items accompanied by a binary label: the identity information between the two data items.

The training base thus includes pairs of training data items to be compared.

In the proposed example, the training base comprises between 50,000 pairs and 150,000 pairs, preferably between 90,000 pairs and 110,000 pairs.

For example, the identity information is a binary value equal to 0 when the two data items are different and 1 when the two data items are identical.

The creation is implemented by selecting data from the database. Preferably, the selection is random.

The selection is done such that a portion of between 45% and 50% of the pairs belonging to the training base is made up of identical pairs; this proportion makes it possible not to give more weight to false negatives than to false positives and can be modified.

The created training base is next stored in one of the memories 18.

At the end of the creation step, the training base is available.

An optimization step is next carried out.

The optimization is applied on three neural networks R1, R2 and R3 that are visible in FIG. 2.

The optimization seeks to obtain three trained neural networks R1, R2 and R3 from the training base.

The first neural network R1 is able to extract, from a first data item D1 of a pair of the training base, a first attribute vector. The first attribute vector is denoted first vector V1 hereinafter.

Each component of the first vector V1 is an attribute relative to the first data item D1.

The second neural network R2 is able to extract, from a second data item D2 of a pair of the training base, a second attribute vector. The second attribute vector is denoted second vector V2 hereinafter.

Each component of the second vector V2 is an attribute relative to the second data item D2.

As previously explained, the first neural network R1 and the second neural network R2 are networks for detecting data attributes and extracting certain attributes from the detectable attributes.

The third neural network R3 is able to perform a set of operations transforming the pair of the first vector V1 and the second vector V2 into a binary value VB representative of the identity between the second training data items D1 and D2.

The third neural network R3 is thus a comparison network.

In the described example, the optimization is done according to two constraints.

The first constraint is a constraint of compliance with the performance criterion.

The second constraint is a constraint according to which the first neural network R1 and the second neural network R2 are identical.

"Identical" in this context means strict identity, i.e., the structure of the neurons is identical and the connections between neurons are also identical. The connections between neurons are sometimes referred to as "weight".

In this sense, the first neural network R1 and the second neural network R2 together form a so-called Siamese network.

In a variant, the optimization is done with more than two constraints.

According to another example constraint, it is possible to ask the complete network to be able to withstand pruning (to be understood as the random elimination of links), which tends to strengthen the generalization of the training to a larger database.

The optimization is implemented according to a back-propagation technique of the gradient of the error.

In fact, the optimization is implemented iteratively, the neural networks R1, R2 and R3 being modified upon each iteration until obtaining a convergence.

In practice, 100 iterations suffice to arrive at the trained neural networks R1, R2 and R3.

In the described example, the first neural network R1 and the second neural network R2 are neural networks including a layer of convolutional neurons followed by a layer of neurons intended to perform pooling. A succession of these two layers is then repeated. This succession is followed by layers of "fully connected" neurons.

The layer of convolutional neurons is able to detect attributes in a given image type, which leads to a very large attribute size.

The neural layer intended to perform pooling is usually called "maxpooling" layer. It makes it possible to obtain a vector of size N smaller than the size of the input and therefore to condense the information.

The layers of fully connected neurons make it possible to reduce the number of components of the vector from N to P, P being an integer strictly less than N. Such a layer of fully connected neurons is a dense or fully connected layer.

For example, N is greater than 100 and P is less than 50. For an image having a size of 128 by 180, N is equal to 320 and P is equal to 20.

In a variant, the first neural network R1 and the second neural network R2 fulfill at least one property chosen from a group of properties. The group of properties is made up of three properties.

According to a first property, the first neural network R1 and the second neural network R2 are neural networks including at least one layer of convolutional neurons.

According to a second property, the first neural network R1 and the second neural network R2 are neural networks including at least one layer of fully connected neurons.

According to a third property, the first neural network R1 and the second neural network R2 are neural networks including at least one layer of neurons intended to perform pooling.

According to a fourth property, the weights of the first neural network R1 and the second neural network R2 are strictly identical.

According to the example described here, the first operation of the third neural network R3 is the concatenation of the two attribute vectors V1 and V2.

Furthermore, the third neural network R3 is a network whereof the neurons are fully connected between each layer.

Furthermore, in the described example, the number of attributes of each attribute vector V1 and V2 is a variable of the optimization step.

In a variant, the training phase includes a step for choosing the number of attributes of each vector, the optimization phase being implemented with the chosen number.

The optimization step is thus a training step for the three neural networks R1, R2 and R3 by training on the training base.

At the end of the optimization step, three trained neural networks R1, R2 and R3 are obtained.

The neural network combining the three trained neural networks R1, R2 and R3 complies with the performance criterion and the first neural network R1 and the second neural network R2 are identical.

During the preparation phase, the database is prepared to use it during the operating phase.

The preparation phase includes an application step during which the first neural network R1 is applied on each data item from the database to obtain basic attribute vectors.

This makes it possible to obtain a new database, the new database associating a basic attribute vector with each data item from the database.

At the end of the preparation phase, a new database is obtained.

The operating phase includes a usage step, an obtaining step and a selection step.

In the usage step, the first neural network R1 is applied to a data item to be compared. An attribute vector to be compared is thus obtained.

In the obtaining step, for each basic attribute vector, a binary value VB representative of the identity between the data item to be compared and a data item from the database is obtained.

The binary value VB representative of the identity between the data item to be compared and a data item from the database is obtained by applying the third neural network R3 to the basic attribute vector (attribute vectors stored in the base) and the attribute vector to be compared.

In the selection step, data items are selected from the database for which the obtained binary value VB corresponds to an identity between the data item to be compared and the data items in the database.

The determining method makes it possible to accelerate fingerprint identification, which is a demand in the identity field.

The determining method proposes to obtain identification with adjustable speed and precision depending on what is desired.

The speed gain results from the fact that in the operating phase, only the comparison part is implemented on attributes are much smaller in size than the data items to be compared and part of the operations are performed in preprocessing during the preparation phase. It should be noted that the implementation time of the first neural network R1 on the input to be compared is negligible relative to the implementation time of the third neural network R3, inasmuch as the third neural network R3 is used for each of the data items in the database.

The speed is increased by a decrease in the number of components of the attribute vector obtained after implementing the first neural network R1. This also makes it possible to decrease the number of layers of the third neural network R3.

According to a variant, the determining method is coupled with another technique.

In such a variant, the desired performance criterion consists of imposing a first minimal precision for the number of pairs correctly identified, the implementation of the data selection step leading to obtaining a plurality of candidate data items. The exploitation phase then includes the implementation of a method for determining the identity between the candidate items and the data item, the method for determining the identity corresponding to a second minimal precision for the identified candidate pairs, the second minimal precision being strictly greater than the first minimal precision. Typically, the traditional and precise solution based on minutiae can be used.

In an imaged manner, with the proposed determining method, a coarse determination (coarse mesh) followed by a fine determination (fine mesh) is done.

Compared to using a determining method with high precision directly, using the method makes it possible to arrive more quickly at the result, since the application of the coarse determination is quick and eliminates most of the initial candidates.

The invention relates to the combination of all technically possible embodiments.

The invention claimed is:

1. A method for determining the membership of a data item, called data item to be compared, in a database, the method including:
   a supervised training phase, the training phase including at least the step of:
      providing a desired performance criterion,
      optimizing three neural networks from a training database, in order to obtain three trained neural networks, the optimization being done under at least two constraints, a first constraint of compliance with the performance criterion and a second constraint according to which the first neural network and the second neural network are identical, the training database including pairs of training data to be compared, the first neural network extracting, from a first data item of a pair of the training database, a first attribute vector, the attributes of the first vector being relative to the first data item, the second neural network extracting, from a second training data item of the same pair, a second attribute vector, the attributes of the second vector being relative to the second data item, the third neural network performing a set of operations transforming the first vector and second vector pair into a binary value representative of the identity between the two learning data items,
   a preparation phase of the database including at least the following step:
      application of the trained first neural network on each data item from the database to obtain basic attribute vectors, and
   an exploitation phase including at least the step of:
      using the first neural network on the data item to be compared, in order to obtain an attribute vector to be compared,
      for each basic attribute vector, obtaining a binary value representative of the identity between the data to be compared and a data item from the database by applying the third neural network to the basic attribute vector and the attribute vector to be compared, and
      selecting data from the database for which the obtained binary value corresponds to an identity between the data to be compared and the data from the database.

2. The method according to claim 1, wherein the desired performance criterion consists of imposing a minimal precision for the number of pairs correctly identified and a minimal execution speed of the operations for the third neural network.

3. The method according to claim 1, wherein the third neural network complies with at least one property chosen from the group of properties made up of:
   a first property according to which the third neural network is a network whereof the neurons are completely connected, and
   a second property according to which the first operation of the third neural network is the concatenation of the two attribute vectors.

4. The method according to claim 1, wherein the first neural network and the second neural network fulfill at least one property chosen from a group of properties made up of:
   a first property according to which the first neural network and the second neural network are neural networks including at least one layer of convolutional neurons,
   a second property according to which the first neural network and the second neural network are neural networks including at least one layer of fully connected neurons, and
   a third property, according to which the first neural network and the second neural network are neural networks including at least one layer of neurons intended to perform pooling.

5. The method according to claim 1, wherein the training phase includes a step for choosing the number of attributes of each vector, the optimization phase being implemented with the chosen number.

6. The method according to claim 1, wherein the data items are at least one of the elements from the group made up of:
   images,
   biometric data items, and
   fingerprints.

7. The method according to claim 1, wherein the desired performance criterion consists of imposing a first minimal precision for the number of pairs correctly identified, the implementation of the data selection step leading to obtaining a plurality of candidate data items, the exploitation phase including the implementation of a method for determining the identity between the candidate items and the data item, the method for determining the identity corresponding to a second minimal precision for the number of pairs correctly identified, the second minimal precision being strictly greater than the first minimal precision.

8. The method according to claim 1, wherein the training phase includes a step for creating the training base by extracting pairs from the database, the extracted pairs being such that a portion of between 45% and 55% of the pairs from the training base are identical pairs.

9. A computer program product including a non-transitory computer-readable information medium, on which a computer program is stored comprising program instructions, the computer program being able to be loaded on a data processing unit and suitable for driving the implementation of a method according to claim 1 when the computer program is implemented on the data processing unit.

10. A non-transitory computer-readable information medium including program instructions forming a computer program, the computer program being able to be loaded on a data processing unit and suitable for driving the implementation of a method according to claim 1 when the computer program is implemented on the data processing unit.

\* \* \* \* \*